United States Patent [19]

Lin

[11] Patent Number: 4,477,326

[45] Date of Patent: Oct. 16, 1984

[54] POLYPHOTOINITIATORS AND COMPOSITIONS THEREOF

[75] Inventor: Samuel Q. S. Lin, South Windsor, Conn.

[73] Assignee: Loctite Corporation, Newington, Conn.

[21] Appl. No.: 505,588

[22] Filed: Jun. 20, 1983

[51] Int. Cl.$^3$ .............................................. C08F 2/46
[52] U.S. Cl. ....................... 204/159.13; 204/159.22; 204/159.24; 528/15; 528/24; 528/25; 528/26; 528/29; 528/33; 528/37
[58] Field of Search ................... 204/159.13, 159.22, 204/159.24; 528/15, 24, 25, 26, 29, 33, 37

[56] References Cited

U.S. PATENT DOCUMENTS 4,273,907 6/1981 Takamizawa et al. .
4,391,963 7/1983 Shirahata .

FOREIGN PATENT DOCUMENTS 51-34291 3/1976 Japan .
53-71199 6/1978 Japan .
54-50067 4/1979 Japan .

OTHER PUBLICATIONS

Chemical Abstracts 97: 23997x, 1982.

Primary Examiner—Melvin I. Marquis
Attorney, Agent, or Firm—Walter J. Steinkraus; Eugene F. Miller

[57] ABSTRACT

Polysiloxane polymers with photoinitiating functionality. The polymers may be obtained by reacting α-allylbenzoin ethers with a siloxane or polysiloxane containing a plurality of silicon hydride groups. Alternatively, the allylbenzoin ethers may be reacted with a hydrolyzable hydrosilane and further reacted with other hydrolyzable organosilanes or siloxanes to form the polysiloxane with pendant photoinitiating benzoin ether groups. The other hydrolyzable silanes or siloxanes may include photocurable groups to yield self curing polymers. In the same manner, photoinitiating siloxane polymers of the first method may be further polymerized to yield self curing products. The photoinitiating polymers may also be combined with ethylenically unsaturated monomers or other silicones with photocurable groups to yield photocurable compositions.

7 Claims, No Drawings

POLYPHOTOINITIATORS AND COMPOSITIONS THEREOF

BACKGROUND OF THE INVENTION

This invention relates to novel free radical generating photoinitiators which are used for curing polymer compositions such as coatings, adhesives, molding compounds or thermoset structural resins. The invention also encompasses processes for making and using the novel initiators and compositions derived therefrom.

The primary function of a photoinitiator is to generate radicals which initiate polymerization when the photoinitiator is irradiated with ultraviolet (UV) light. Photoinitiators are classified into intermolecular H-abstraction and intramolecular photocleavage photoinitiators according to the pathways the effective initiating radicals are generated.

The intermolecular H-abstraction photoinitiators include benzophenone and its dialkyl ketone derivatives such as xanthone, thioxanthone, 4,4'-bis(N,N'-dimethylamino) benzophenone, benzil and quinones. Those photoinitiators require hydrogen-donors, such as amines, thiols or alcohol for generating radicals which are effective in initiating polymerization. The process of H-abstraction is a bimolecular reaction requiring the encounter of a photoinitiator and a hydrogen-donor from diffusion through the matrix of resin.

Examples of the intramolecular photocleavage photoinitiators are benzoin, its derivatives, 2,2-dialkoxyacetophenone and o-acylated-α-dialkoxyacetophenone and α-o-acylated-α-oximinoketones. They are decomposed by UV light directly into radicals which are effective in initiating polymerization. This decomposition process is a unimolecular reaction which is inherently more effective than the bimolecular reaction.

Conventional benzoin type photoinitiators decompose into two fragments of radical species upon being excited by UV light. After initiating the polymerization, the fragmented radical species become ends of polymer chains. The architecture of the resin networks, and consequently the properties of the cured resins, are controlled mainly by the composition of crosslinkers (multifunctional monomers) and prepolymers.

Although the photoinitiators exemplified above are soluble and effective in curing organic resins they often have limited solubility in silicones. Consequently their effectiveness in curing silicones is greatly reduced. To overcome this compatibility difficulty, silicone moieties have been chemically bonded with the photoinitiators.

Direct UV-initiated crosslinking of polysiloxane compositions has also been reported where the polysiloxane resins include methyl, vinyl, alkylmercapto and-/or hydrosilyl functionalities. These systems are all believed to involve a hydrogen abstraction mechanism. These compositions have been used for release coatings and electrically resistive circuit board coatings. References describing such systems include Canadian Pat. No. 653,301, to Warrick, 12/4/62; U.S. Pat. No. 3,873,499, to Michael et al., 3/25/75; U.S. Pat. No. 4,064,027, to Gant, 12/20/77; U.S. Pat. No. 4,133,939, to Bokerman et al., 1/9/79; and U.S. Pat. No. 4,052,529, to Bokerman et al., 10/4/77.

A Japanese patent publication, Kokai No. 34,291/76 describes the application of benzophenone derivatives, such as 4-dimethylamino-4'-(trimethoxysilylethyl)dimethylsilybenzophenone, in preparing the silicone compatible photoinitiators. The photoinitiators described in this patent are intermolecular H- abstraction type. The curing time for hardening the resin was around 5 minutes.

Another Japanese patent publication, Kokai No. 71,189/78 describes the application of photoinitiators from the reaction of alkenylsilylbenzophenone and silicones containing silicon- hydrides. Those photoinitiators are intermolecular H- abstraction type which required longer than ten minutes curing time.

Japanese patent publications, Kokai No. 50,067/79 and Kokai Tokkyo Koho No. JP82 09,792 (Chemical Abstracts, 97:23997x, 1982) describe the application of benzoin type photoinitiators attached to the ends of polydimethylsiloxane or to the cyclicsiloxanes through Si—O—C bond. Although these photoinitiators are the intramolecular photocleavage type they are inherently not stable in moisture. The SiOC bond is well known to be hydrolytically unstable and can be decomposed by water to form back silanol and benzoin which has very limited solubility in silicones.

SUMMARY OF THE INVENTION

The novel photoinitiators of the present invention are polyorganosiloxane polymers (silicones) which include a plurality of photoinitiating functional groups attached to the polymer through a carbon-silicon bond. The photoinitiating groups are preferably intramolecular photocleavable molecular fragments. More specifically they are silicones with a plurality of photocleavable benzoin derivatives attached pendently to the polymer backbone by means of carbon-silicon bonds. They may be obtained by reacting α-allylbenzoin ether analogs with a polyorganosiloxane containing a plurality of silicon hydride (—Si—H) groups.

As an alternative to synthesis from

functional silicones hydrolyzable

functional silanes may be reacted with α-allylbenzoin ethers to form silane adducts which can then be polymerized to photoinitiating organosiloxane polymers by hydrolysis. Copolymerization of the allylbenzoin ether-hydrolyzable silane adducts with other hydrolyzable organosilanes permits direct synthesis of polyphotoinitiators with desired physical properties and/or other desired funtionalities.

Additional functional groups may also be added to a photoinitiating silicone prepared by either method of this invention by subsequent further randomization polymerization with an appropriately functionalized silane or siloxane using conventional silicone preparation techniques.

The polyorganosiloxane polyphotoinitiators of the invention may be made self curing if free radical curable groups, such as vinyl, mercapto, and methacrylate, are incorporated on the polymer. Alternatively, compositions of the inventive polyphotoinitiators with other silicones containing such groups, or with ethylenically unsaturated monomers, can be cured rapidly by exposure to UV light.

The α-allylbenzoin ether-hydrolyzable silane adducts are also usable as photoinitiators and are considered part of the present invention.

In comparison with the conventional photoinitiators, the polyphotoinitiators of the present invention offer the following advantages: lower expected toxicity because of lower volatility and lower permeability to skin; faster curing speed; better solubility in polyorganosiloxane compositions; and, in mixtures with unsaturated monomers, they form graft copolymers of polyorganosiloxane with improved low temperature flexibility, weatherability, insulating properties and impact strength.

In mixtures with unsaturated monomers or polymers, the products of the invention act as prepolymers since the polymer initiates a plurality of chains by addition to the vinyl group. They are thus especially useful in adhesive compositions where multiple simultaneous chain additions to the polysiloxane backbone can be used to produce an especially fast curing tough material When used with adhesives, at least one of the substrates must be transparent.

The inventive products may also be used as ingredients of printing inks, photoresists, lithographics, and in coatings for plastics, wood, paper, etc. to produce protective films of weather resistance, and water repellancy.

DETAILED DESCRIPTION OF THE INVENTION

The polyorganosiloxane photoinitiators of the invention are organosiloxane polymers whose siloxane chains include a plurality of units of the formula:

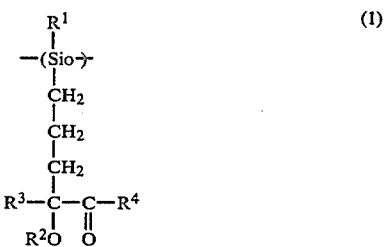

wherein $R^1$ is alkyl, aryl, alkoxy, substitued alkyl or substituted aryl; $R^2$ is alkyl, aryl, substituted alkyl or substituted aryl; and $R^3$ and $R^4$ are phenyl or substituted phenyl. Specific examples of $R^1$ and $R^2$ groups include methyl, phenyl, trifluoropropyl, ethyl and cyanopropyl. Phenyl substituents for the $R^3$ and $R^4$ groups could be alkyl, alkoxy, alkoxy, halide, alkaryl, cyanoalkyl, haloalkyl, and N,N-dialkylamino.

The polyorganosiloxane photoinitiators can be linear cyclic or branched and terminated with hydroxyl, alkoxyl, acetoxyl, trimethylsiloxyl, etc., preferably trimethylsilyl. The siloxane chain is preferably between 20 and 2000 units long. The concentration of the photoinitiator repeating units of formula (1) in the polymer can range from 0.1 to 50%, preferably between 0.5 and 5%. Other organo groups which may be included on the siloxane backbone include olefinic radicals such as vinyl, propenyl and butenyl; alkyl; aryl; alkoxy; acrylates; cyanopropyl; mercaptopropyl and trifluoropropyl.

PREPARATION OF α-ALLYLBENZOIN ETHER

The analogues of α-allylbenzoin ether have the following molecular structures, the R groups defined as above.

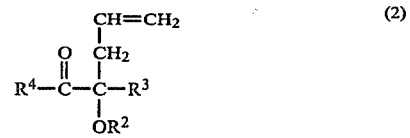

They may be prepared by a number of reactions including the following:

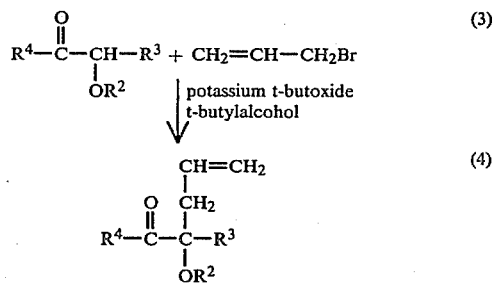

EXAMPLE I

Benzoin ethyl ether (150 g) and t-butanol (750 g) were added into a two liter, three-necked, round-bottomed flask with magnetic stirring in an oil bath and heated to 50° C. to dissolve the benzoin ethyl ether. The solution turned black after the addition of 73.7 g of potassium t-butoxide. Allyl bromide (92.4 g) was added slowly into the stirring solution at 80° C. The reaction was refluxed for 2 hours and allowed to cool down. After evaporation of the t-butanol and filtration of potassium bromide salt the crude product was subjected to distillation at 118°±2° C. and 0.05 mm Hg to obtain 158 g of allylbenzoin ethyl ether which crystallized upon cooling.

EXAMPLE II

Benzoin methyl ether (50 g) and t-butanol (500 g) were added to a 1 liter, 3neck, round bottom flask equipped with magnetic stirrer, and placed in an oil bath at 80° C. To this mixture, 33.7 g of potassium t-butoxide was added and the solution stirred for 15 minutes. Allyl Bromide (42.3 g) was added dropwise over a 1 hour period and stirring was continued at 85° C. for 2 more hours then cooled to room temperature. After evaporation of t-butanol and filtration of potassium bromide, the product was distilled at 125° C.±2° C. and 0.05 mgHg to yield 49.2 g of allylbenzoin methyl ether which crystallized upon cooling.

The allylbenzoin ethers may also be prepared by the reaction of the appropriate benzoin ether with aqueous NaOH and allyl bromide in dimethylsulfoxide

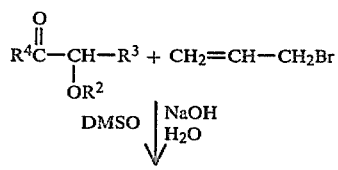

-continued

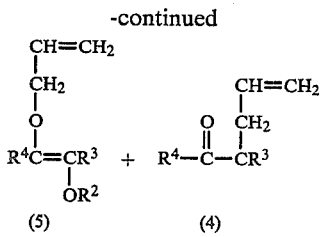

(5)      (4)

The O-allyl products (5) of this reaction will rearrange to the α-allylbenzoin ether (4) during distillation making this a feasible synthetic route.

PREPARATION OF POLYSILOXANE PHOTOINITIATORS

The inventive method for preparing the novel photoinitiators of the present application is the reaction of an α-allylbenzoin ether with an organohydrosilane in the presence of a hydrosilation catalyst to link the reactants through a carbon-silicon bond. The Si—C linkage is created by addition of Si and H across the allyl double bond.

A. Synthesis From Polysiloxanes

The organohydrosilane may be a polyorganosiloxane or low molecular weight analog with silicon hydride groups as represented by formula (6):

wherein $R^1$ is defined as above for formula (1); $R^5$ and $R^6$ are halo or organo groups excluding alkenyl and alkynyl; and m and n are integers. Examples of $R^5$ and $R^6$ substituents include methyl, ethyl, phenyl, trifluoropropyl, methoxyl, acetoxyl and chloride. The silicone may be cyclic or terminated with any group satisfying the definition of $R^5$ and $R^6$. Branched silicones with silicon hydride functionality may also be used.

The reactions are carried out with a catalyst. The hydrosilation catalysts are well-known for those skilled in the art. Examples are platinum, chloroplatinic acid, hydrocarbon-platinum complexes, rhodium complexes, etc. Platinum based catalysts are preferred at levels of between 10 ppm to 500 ppm platinum, preferably between 50 ppm to 300 ppm.

The reaction temperatures are from room temperature to 250° C. depending on the concentration and the types of catalysts used. The preferred temperatures are from 50° C. to 150° C.

The reactions can be carried out neat or in organic solvents which do not interfere with the hydrosilation. Examples of the solvents are toluene, hexane, tetrahydrofuran, methylene dichloride, benzene, etc. The reactions were followed easily by the disappearance of SiH absorption peak at 2200 cm$^{-1}$ of the infrared spectrum. Normally the reactions were complete within three hours.

Examples III, IV and V are examples of photoinitiator preparations from polysiloxanes containing silicone hydride groups.

EXAMPLE III

Into a 100 ml three-necked round-bottomed flask equipped with a condensor and a magnetic stirrer were added 36 g polydimethyl siloxane terminated with silicon hydride (viscosity 8 cps and 0.2% H by weight) and 22 g of allylbenzion ethyl ether. After raising the temperature to 65° C., 0.17 g of 2% by weight chloroplatinic acid in butyl acetate was added into the flask. An exotherm was observed immediately and the reaction was maintained at 95° C. for 30 minutes. Infrared showed the SiH absorption peak disappeared indicating the reaction was complete.

EXAMPLE IV

Placed into a 100 ml three-necked round bottom flask were 28.7 g of a 30 cts viscosity polydimethylsiloxane containing 0.25% by weight reactive silicon hydride, 21.0 g allylbenzoin and about 5 ml hexane. The three-necked flask was equipped with a condensor, a nitrogen inlet, a magnetic stirrer and a thermometer. Immediately after adding the solution of chloroplatinic acid in butylacetate (20 ppm Pt by weight) into the stirring solution, the temperature exothermed to 140° C. The temperature was maintained at 90° C.±5° C. for five hours to complete the reaction. This polydimethylsiloxane polyphotoinitiator contained about 18.8% by repeat unit photoinitiator.

EXAMPLE V

Into a 100 ml three-necked round bottom flask equipped with magnetic stirrer, condenser, and thermometer were placed 17.5 g of allylbenzoin methyl ether, 26.4 g of a polydimethylsiloxane containing 17% methylhydrogen units and terminated with silicon hydride (viscosity 30 cps, 0.25% H by weight), and 25 ml hexane. After raising the temperature to 65° C., 15 g of 2% by weight chloroplatinic acid in butylacetate was added. An immediate exotherm was observed and reaction temperature was maintained at reflux for 15 minutes after which time an infrared spectrum was taken. The absence of the Si-H peak indicated that reaction was complete.

The exclusion of alkenyl and alkynyl from the definition of $R^5$ and $R^6$ in formula (6) is necessary because unsaturated bonds on the polymer will compete with the allyl double bond during the hydrosilation reaction. However, the initiators prepared from polymers as defined in formula (6) may subsequently be further reacted with linear or cyclic siloxanes of different substituents by acid or base catalysts to prepare siloxanes with various concentrations of photoinitiators and different substituents. Acid catalysts are preferred when the substituents on the siloxanes are base sensitive. Examples of the base sensitive substituents are alkoxyl, hydride, halide, alkylcarboxyl and etc. The acid catalysts are sufuric acid, trifluoromethane sulfonic acid, and Lewis acids such as ferric chloride, zinc chloride, and boron trifluoride.

On the other hand, if the substituents on the silicones are acid sensitive such as vinyl and amino, base catalysts are preferred. The base catalysts include potassium hydroxide, quaternary ammonium hydroxides, tetraalkylphosphonium hydroxides, etc.

Examples VI and VII demonstrate that other functional groups such as vinyls can be incorporated onto a polyorganosiloxane polyphotoinitiator by further polymerization of polyphotoinitiator.

EXAMPLE VI

Placed into a 500 ml resin kettle were 24 g of the polyphotoinitiator of Example III, 7.0 g of 1,3,5,7-tetravinyltetramethylcyclotetrasiloxane and 261.2 g of octamethylcyclotetrasiloxane. About 0.2 g of a base catalyst, prepared from heating a mixture of tetramethylammonium hydroxide and octamethyltetrasiloxane at 100° C. for 5 hours, were added into the solution. The reaction was maintained at 90° C. for 48 hours and then at 150° C. for 5 hours, followed by filtration and vacuum stripping for removing volatiles to give a colorless viscous liquid. The resulting polydimethylsiloxane polyphotoinitiator contained 2% vinyl and 2% photoinitiator by repeat unit.

EXAMPLE VII

Into a 500 ml reaction kettle equipped with mechanical stirring and a nitrogen blanket were placed 30.3 g of the product from Example V, 6.9 g of 1,3,5,7-tetramethyl, 1,3,5,7-tetravinylcyclotetrasiloxane, and 262.8 g of octamethylcyclotetrasiloxane. The kettle was placed in an oil bath at 95° C. and the mixture purged with nitrogen for one hour at which time 0.3 g of tetramethylammonium silanolate was added and stirring was continued for 24 hours at 90° C. The temperature was then raised to 150° C. and held there for 5 hours to destroy the catalyst then a vacuum of 0.5 mmHg was applied to remove the catalyst and volatile side products.

EXAMPLE VIII

Low molecular weight siloxanes may also be used to prepare polyphotoinitiators of the invention. The photoinitiator siloxane compound of the general formula:

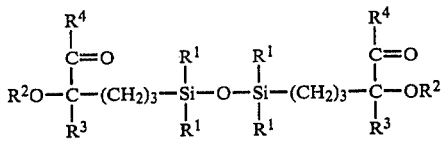

wherein the $R^1$ groups are all methyl, $R^2$ is ethyl and $R^3$ and $R^4$ are phenyl was prepared by weighing 89.4 g alpha-allyl benzoin ethyl ether and 21.4 g tetramethyldisiloxane into a one liter, three-necked round bottomed flask equipped with a magnetic stirrer, condensor, nitrogen blanket and thermometer. 200 ml toluene was added and the flask heated in an oil bath to reflux (about 110° C.). 3.0 g chloroplatinic acid/butyl acetate solution (50 ppm Pt) was added and the reflux continued under nitrogen for about 18 hours. Activated charcoal was then added (10 g) and reflux continued for 3 additional hours. Mixture was filtered and the product isolated by stripping the solvent with a rotary evaporator at 0.5–01 mm Hg. The disiloxane photoinitiator product may be equilibrated as in Examples VI and VII with other siloxanes to yield photoinitiating polymers.

Example IX demonstrates an acid catalyst further polymerization of a silicone hydride functional cyclic photoinitiating siloxane of the invention.

EXAMPLE IX 5 g 1,3,5,7-tetramethylcyclotetrasiloxane ($8.32 \times 10^{-2}$ equivalents SiH), 11.7 g alpha-allyl benzoin ethyl ether ($4.17 \times 10^{-2}$) and 50 g octamethylcyclotetrasiloxane were weighed into a 250 ml three-necked flask equipped with condensor, thermometer, nitrogen blanket and magnetic stirrer. The flask was placed in an oil bath at 75° C. and purged with hydrogen for 15 minutes. Infrared showed SiH at 2160 cm$^{-1}$. When the flask temperature reached 70° C., 0.2 g of 2% chloroplatinic acid solution (16 ppm Pt) were added. After 2 minutes, a 20° C. exotherm was observed. Infrared after 35 minutes showed SiH present at one half its original concentration and heating was discontinued. The reaction mixture was transferred to a larger flask and 97.6 g octamethylcyclotetrasiloxane and 2.4 ag hexamethyldisiloxane were then added and the temperature again brought to 70° C. 1.5 gH$_2$SO$_4$ were added and the reaction was stirred for 4 hours. IR's taken at various intervals showed SiH still present. After 4 hours, 3.5 NaHCO$_3$ were added and the reaction was stirred overnight at room temperature. The reaction mixture was then filtered and the product was stripped for three hours at 100° C. at 0.5–0.1 mmHg.

B. Synthesis From Hydrolyzableorganosilanes

The α-allybenzoin ethers may be hydrosilated with a hydrolyzable organosilane to give an adduct compound represented by the formula:

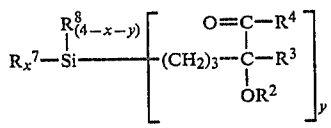

where x is 0, 1 or 2, y is 1, 2 or 3 and x+y=3; $R^7$ is alkyl, aryl, substituted alkyl or substituted aryl; and $R^8$ is a hydrolyzable group. Preferably x and y are 1, $R^7$ is methyl or phenyl and the remaining $R^8$ groups are bromo, chloro, alkoxyl, acetoxyl, dimethylamino or aryloxyl.

Compounds of formula (7) are polysiloxane monomers which polymerize by conventional silane hydrolysis techniques. When hydrolyzed in the presence of other hydrolyzable organosilanes or organosiloxane, polymers with a desired amount of photoinitiator content can be prepared. The other hydrolyzable organosilanes or organosiloxanes may advantageously include functional groups which are reactive with free radicals to produce self-curing silicones.

Examples X and XI exemplify the synthesis of photoinitiating polysiloxanes from hydrolyzable organosilanes.

EXAMPLE X

Into a 500 ml round-bottomed three-necked flask equipped with a magnetic stirrer, a thermometer, a dry ice condensor, and a nitrogen inlet, were added 18.5 g of allylbenzoin ethyl ether, 10 ml toluene and three drops of 2% chloroplatinic acid in butylacetate. Then 8 g of methyldichlorosilane in a 50 ml addition funnel was added slowly into the stirring solution in the flask while maintaining the reaction temperature at 70° C. The reaction was completed in 30 minutes after the disappearance of SiH absorption peak at 2200 cm$^{-1}$ on the infrared spectrum. A dry atmosphere was maintained throughout the reaction by a nitrogen blanket.

EXAMPLE XI

A hydrogen chloride trap (a saturated NaOH aqueous solution) was attached to the reaction flask (in Example X) through a tygon tube. Then 2.0 g of methyltrichlorosilane, 143 g dimethyldichlorosilane and 13 g of methylphenyldichlorosilane were added into the product solution in the flask. 40 ml H$_2$O was then gradually added through an addition funnel to the stirring solution. The reaction was monitored by the evolution of HCl gas. After evolution of HCl gas stopped the reaction was continued at 90° C. for one hour. The crude product was dissolved in 250 ml ether and neutralized with 8% by weight of aqueous sodium bicarbonate solution (4×250 ml), washed thoroughly with water (4×250 ml), dried over MgSO4 and then stripped at 2 mm Hg for two hours to give 87.5 g polyphotoinitiator siloxane.

COMPOSITIONS

The photoinitiators of the invention are compatible with other silicones. They may be compounded with silicones containing photocurable groups such as acrylate, methacrylate, vinyl, silicon hydride, alkylthiol, styryl, acrylamido, methacrylamide, maleate and itaconate. As in Examples VI–VIII, the polymerizable functionality may be synthesized as part of the same siloxane chain which includes the benzoin ether functionality. In either case, the resulting composition would be curable on exposure to UV radiation. Such compositions are useful in coatings, sealants, pottings and adhesives, exhibiting the typical silicone properties: low temperature flexibility, good electrical properties, good weather resistance and excellent thermal stability.

EXAMPLE XII

The compositions listed in Table I were prepared to test the initiating capability of the polyorganosiloxane polyphotoinitiator of Example VI.

TABLE I

|     | Silicone #1 | Silicone #2 | Example-VI Polyphoto-initiator | Curing Time |
|-----|-------------|-------------|--------------------------------|-------------|
| (1) | 4.5 g       |             | 2 g                            | 40 sec.     |
| (2) | 4.5 g       |             | 4 g                            | 30 sec.     |
| (3) |             | 3 g         | 2 g                            | 30 sec.     |
| (4) |             |             | alone                          | 30 sec.     |

Silicone #1 is a polydimethylsiloxane, 600 cts viscosity, and terminated with methacryloxypropyldimethylsilyl groups. Silicone #2 is an approximately 100,000 high molecular weight polydimethylsiloxane gum containing 18% by repeat unit vinyl functional group and is terminated with trimethylsilyl groups. Each composition was coated on a glass slide to form a 20–30 mil film and exposed to UV at 70,000 uw/cm² for the specified time. Each composition cured to a flexible film which was very transparent and did not become cloudy over time.

EXAMPLE XIII

A thin film of the product of example IX was spread on a glass slide and irradiated for 1 minute per side with UV light as in example XII. The material cured to a rubbery solid film.

Other compositions especially useful as adhesives may be formulated as a mixture of polysiloxane photoinitiator, ethylenically unsaturated monomers and inhibitors. Optional ingredients include multifunctional ethylenically unsaturated monomers; fillers such as fumed silica, glass fibers, synthetic fibers and aluminium oxides; pigments; adhesion promoters such as silane coupling agents; and other additives used in conventional adhesive or coating materials.

The ethylenically unsaturated monomers are those readily polymerized by radical chain mechanisms. Examples are acrylates, methacrylates, maleates or itaconates of monohydric or polyhydric alcohols, such as lauryl alcohol, neopentyl alcohol, triethylene glycol, tripentaerythritol and pentaerythritol; epoxy acrylates; vinyl ketones; styrenes; acrylamide or methacrylamide and their n-substituted derivatives. Mixtures of these monomers can also be formulated with the photoinitiators of the present invention. Any free radical polymerizable monomer may be used provided that it is compatible with the specific polyorganosiloxane photoinitiator with which it is compounded.

The concentration of the polyorganosiloxane photoinitiator in the compositions of this invention can range between about 1% and about 70%, preferably between 5% and 40%. The optimum concentration depends on the desired physical properties of the cured resins. In general, higher concentrations of photoinitiators give softer cured resins.

Common free radical polymerization inhibitors such as hydroquinone, benzoquinone or hindered phenols may be used in the adhesive compositions, typically at levels below 1000 ppm. Other free radical inhibitors may be used without departing the scope of this invention.

EXAMPLE XIV

The compositions listed in Table II were prepared, coated on glass slides and cured by UV light as in example XII.

TABLE II

|     | Cyclohexyl Methacrylate | Tetrahydrofurfuryl Methacrylate | Example-VI Hexanediol Dimethacrylate | Isobornyl Acrylate | Example VI Polyphoto-Initiator | Cure Time |
|-----|-------------------------|--------------------------------|--------------------------------------|--------------------|--------------------------------|-----------|
| (1) | 0.3 g                   | —                              | —                                    | —                  | 1 g                            | 1 min     |
| (2) | 0.1 g                   | —                              | —                                    | —                  | 1 g                            | 1 min     |
| (3) | —                       | 0.2 g                          | —                                    | —                  | 1 g                            | 1 min     |
| (4) | 1 g                     | —                              | 0.5 g                                | —                  | 1 g                            | 1 min     |
| (5) | 1 g                     | —                              | 1 g                                  | —                  | 1 g                            | 1 min     |
| (6) | —                       | —                              | —                                    | 1 g                | 1 g                            | 30 sec    |
| (7) | —                       | —                              | —                                    | 2 g                | 1 g                            | 1 min     |

The resulting cured films varied from transluent to opaque. All were tough flexible films which exhibited stress-whitening phenomena when stretched, indicating that graft copolymers had formed. The cured film from composition 7 remained flexible even at −40° C.

The compositions of this invention may be exposed to actinic light from any source and of any type as long as it supplies sufficient amount of ultraviolet light of between 200 nm and 400 nm. The most common source is medium-pressure mercury arc. The curing time depends on the specific ingredients in the composition, the amount of the photoinitiators and the intensity of the UV light.

From the foregoing it can be seen that in addition to the specific examples, many further variations within the skill of those practicing in the art may be employed

I claim:

1. A UV curable composition comprising a mixture of an organosiloxane polymer and at least one ethylenically unsaturated free radical polymerizable organic monomer, the organosiloxane polymer including a plurality of photoinitiating units along the chain thereof the units having the formula:

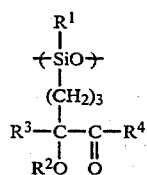

wherein $R^1$ is alkyl, aryl, alkoxy, substituted alkyl or substituted aryl; $R^2$ is alkyl, aryl, substituted alkyl or substituted aryl; and $R^3$ and $R^4$ are phenyl or substituted phenyl.

2. A composition as in claim 1 wherein the ethylenically unsaturated monomer is selected from the group consisting of acrylate, methacrylate, maleate and itaconate esters; vinyl ketones; styrenes; acrylamide, methacrylamide and their N-substituted derivatives, and mixtures thereof.

3. A composition as in claim 1 wherein said organosiloxane polymer is present in the range of between about 1% and 70% by weight of the composition.

4. A composition as in claim 1 wherein said organosiloxane polymer is present in the range of between about 5% and 40% by weight of the composition.

5. A composition as in claim 1 further comprising an inhibitor selected from the group consisting of hydroquinone, benzoquinone and hindered phenols.

6. A composition as in claim 1 wherein the ethylenically unsaturated monomer is selected from cyclohexylmethacrylate, tetrahydrofurfural methacrylate, hexanediol dimethacrylate, isobornylacrylate, and mixtures thereof.

7. A cured product of the composition of claim 1.

* * * * *